(No Model.) 5 Sheets—Sheet 1.
F. DANNER.
REGENERATIVE GAS FURNACE.
No. 482,117. Patented Sept. 6, 1892.
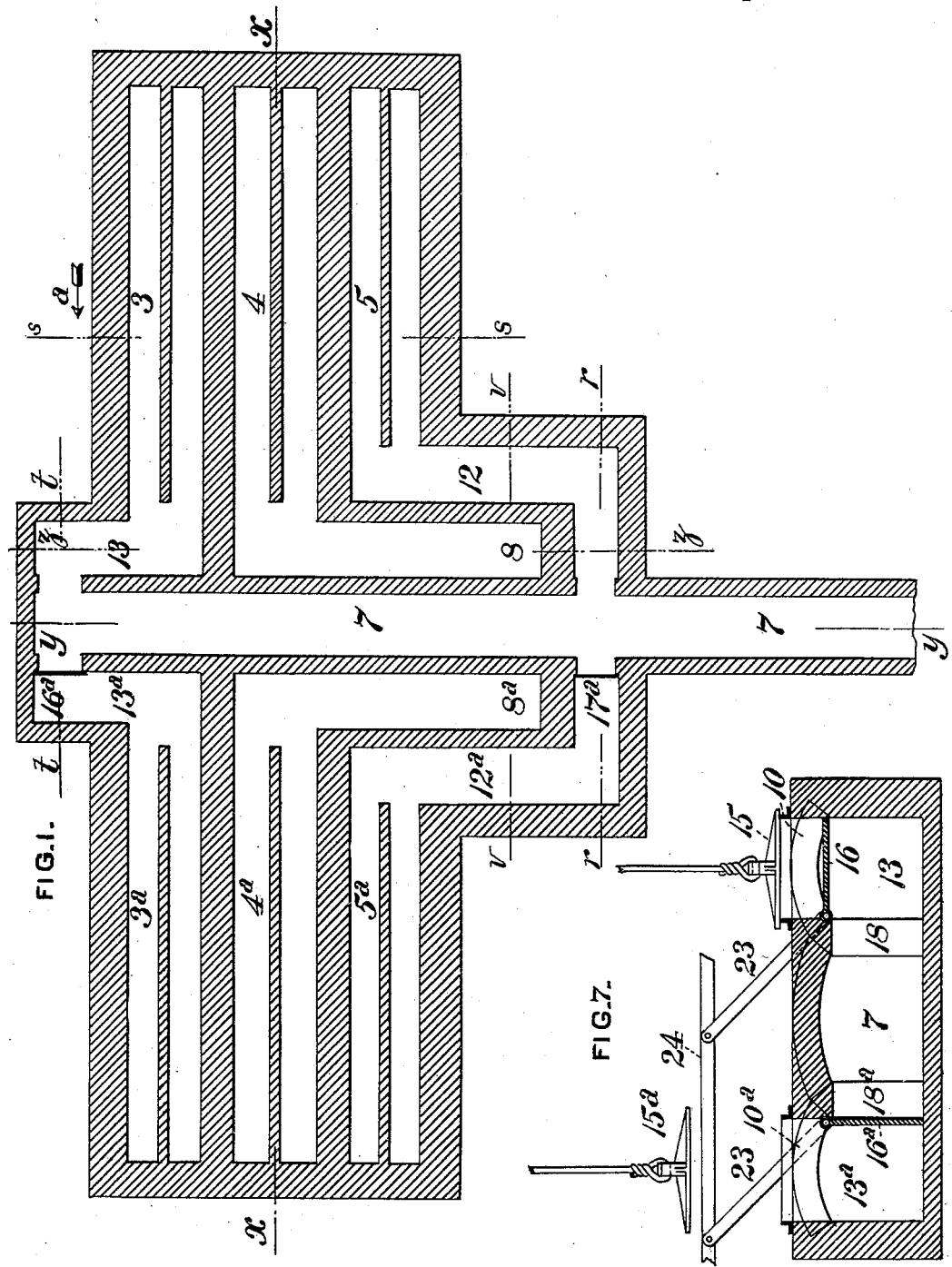
WITNESSES:
INVENTOR,
Friedrich Danner (No Model.) 5 Sheets—Sheet 2.
F. DANNER.
REGENERATIVE GAS FURNACE.
No. 482,117. Patented Sept. 6, 1892.
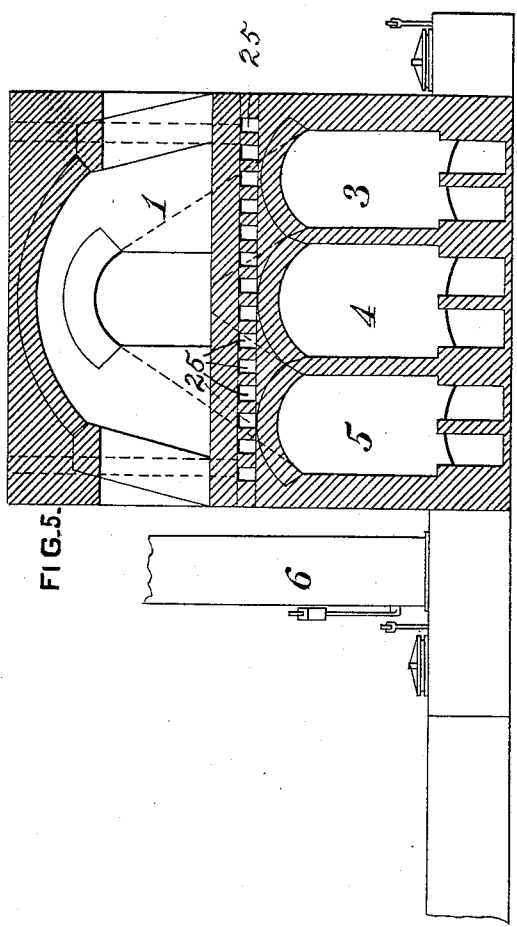
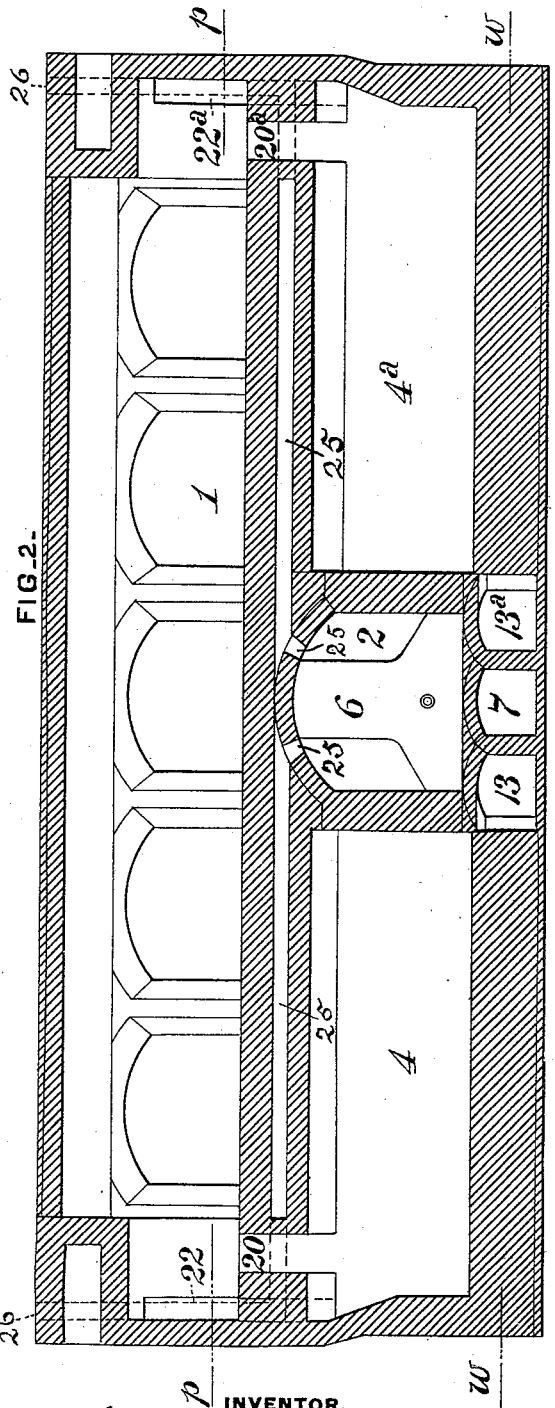
WITNESSES:
T. J. Hogan.
F. E. Gaither
INVENTOR,
Friedrich Danner
by Snowden Bell,
Att'y.

(No Model.) 5 Sheets—Sheet 3.

F. DANNER.
REGENERATIVE GAS FURNACE.

No. 482,117. Patented Sept. 6, 1892.

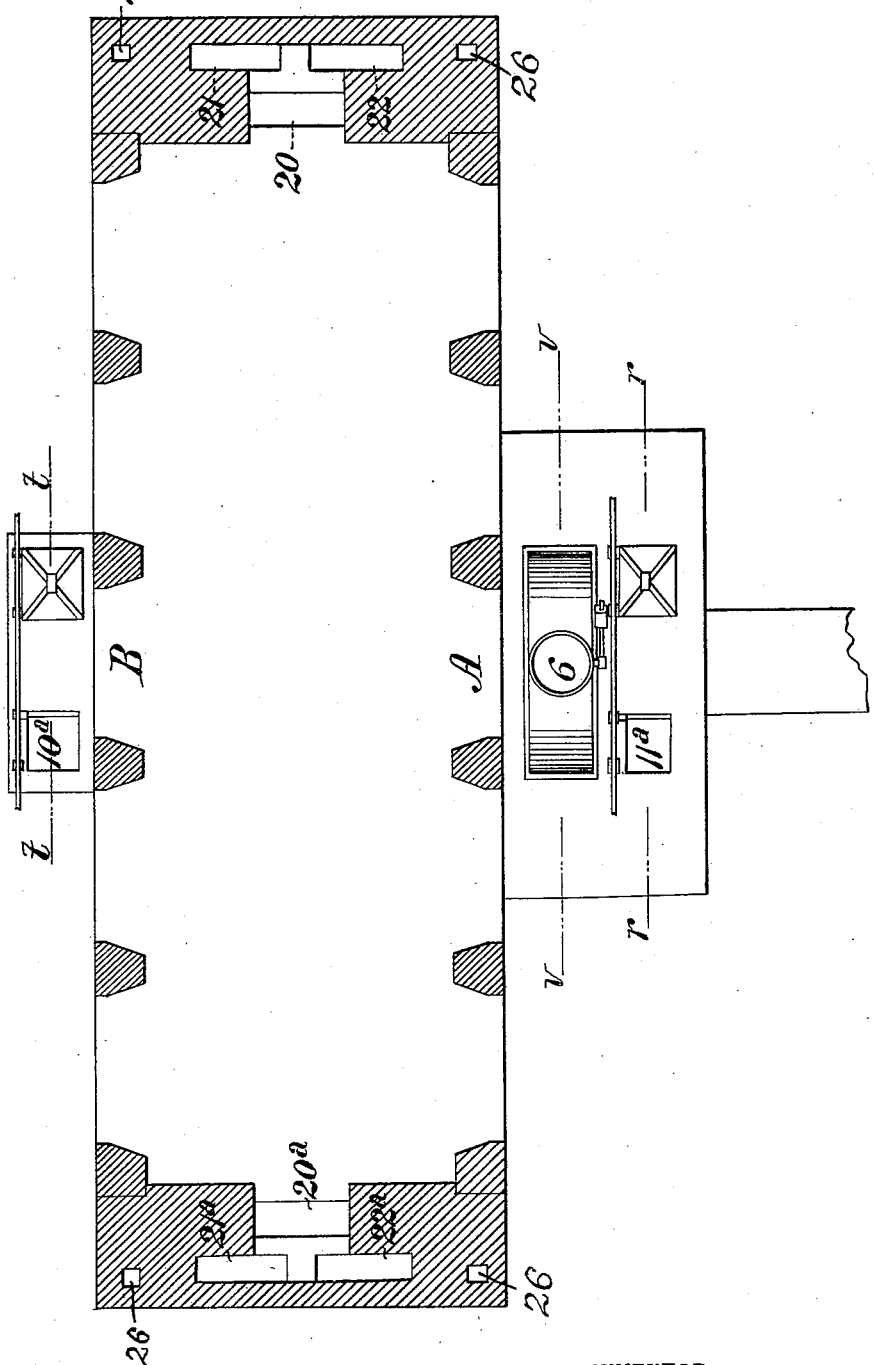

(No Model.) 5 Sheets—Sheet 5.

F. DANNER.
REGENERATIVE GAS FURNACE.

No. 482,117. Patented Sept. 6, 1892.

WITNESSES:
T. J. Hagan.
F. E. Gaither.

INVENTOR,
Friedrich Danner
by Snowden Bell,
Att'y.

UNITED STATES PATENT OFFICE.

FRIEDRICH DANNER, OF TARENTUM, ASSIGNOR OF ONE-HALF TO THE PITTSBURGH PLATE GLASS COMPANY, OF CREIGHTON, PENNSYLVANIA.

REGENERATIVE GAS-FURNACE.

SPECIFICATION forming part of Letters Patent No. 482,117, dated September 6, 1892.

Application filed February 27, 1892. Serial No. 423,036. (No model.)

*To all whom it may concern:*

Be it known that I, FRIEDRICH DANNER, a citizen of the United States, residing at Tarentum, in the county of Allegheny and State of Pennsylvania, have invented or discovered a certain new and useful Improvement in Regenerative Gas-Furnaces, of which improvement the following is a specification.

The object of my invention is to provide effective and desirable means for regulating and controlling the quantity and distribution of heat in a regenerative furnace; and to this end it consists in an improved construction and combination of air and gas flues, valves, passages, and regenerator-chambers, as hereinafter fully set forth.

Figure 3:
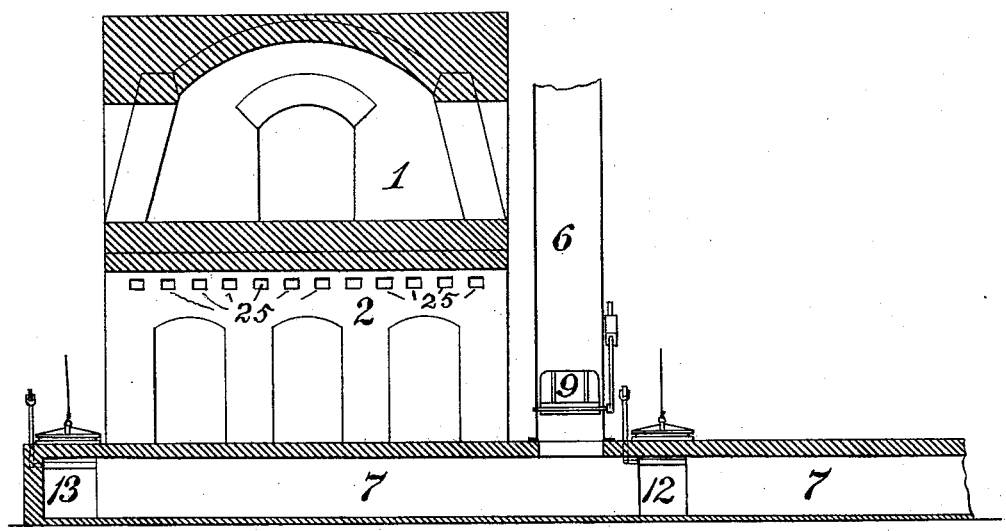
Figure 4:
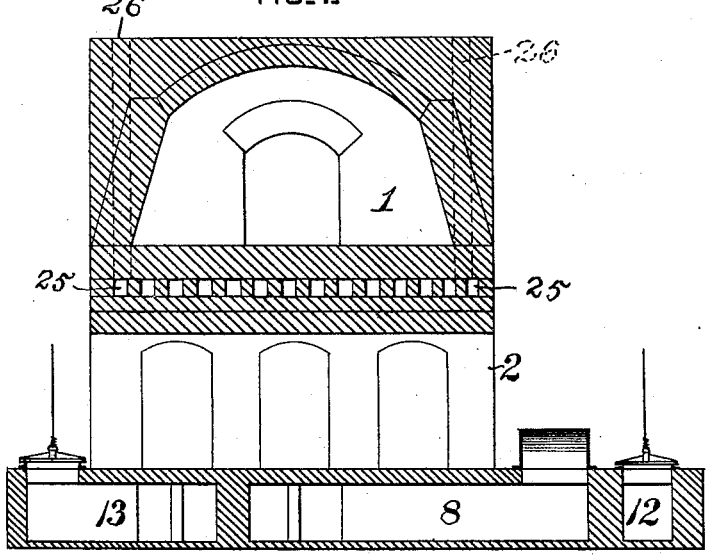
Figure 8:
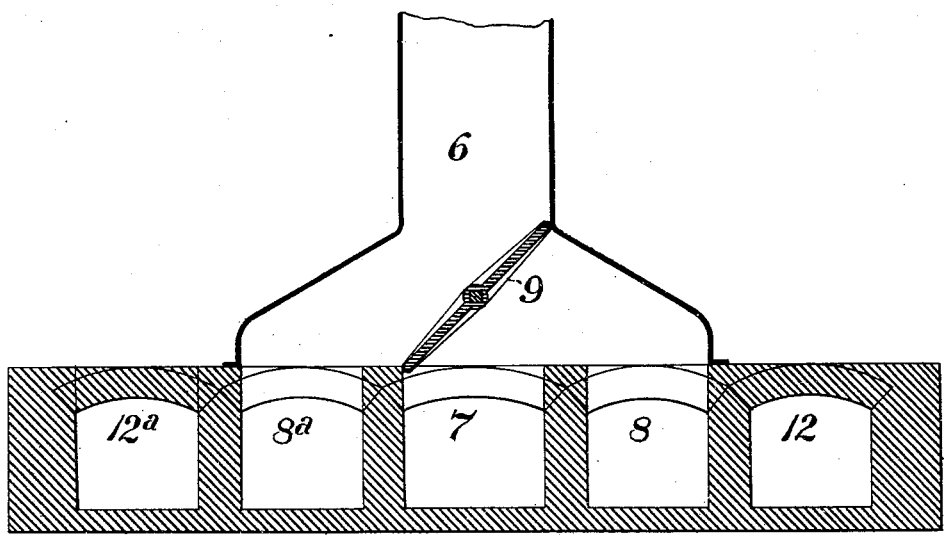

In the accompanying drawings, which illustrate the application of my invention in a glass-furnace, Figure 1 is a horizontal section on the line $w\ w$ of Fig. 2; Fig. 2, a longitudinal vertical section on the line $x\ x$ of Fig. 1; Fig. 3, a vertical transverse section on the line $y\ y$ of Fig. 1; Fig. 4, a vertical cross-section on the line $z\ z$ of Fig. 1; Fig. 5, a vertical transverse section on the line $s\ s$ of Fig. 1, looking in the direction of the arrow $a$; Fig. 6, a horizontal section on the line $p\ p$ of Fig. 2; Fig. 7, a vertical section, on an enlarged scale, on the line $t\ t$ of Figs. 1 and 6; Fig. 8, a vertical section on the line $v\ v$ of Figs. 1 and 6, and Fig. 9 a vertical section on the line $r\ r$ of Figs. 1 and 6.

Below the center of the furnace 1 there is located an arched passage 2, on each side of which are placed regenerator-chambers 3 4 5 and $3^a$, $4^a$, and $5^a$, these chambers being filled with checker-work of refractory material in the usual manner. The air is heated in the chambers 3, 5, $3^a$, and $5^a$, and the gas in the chambers 4 and $4^a$.

Below the hearth of the furnace air-cooling flues 25 extend in both directions from the arched passage 2 to the vertical flues 26, which open above the furnace at each end.

The gas-supply pipe 6 leads from a suitable gas-producer or other source of gas-supply and is located directly over the stack-flue 7 between the gas-flues 8 and $8^a$. It is provided with a reversing-valve 9, by means of which either one of the flues 8 or $8^a$ may be put in communication with the gas-supply pipe 6 and the other put in communication with the stack-flue 7, as clearly shown in Fig. 8.

Air is admitted through the openings 10, $10^a$, 11, and $11^a$ into the passages of flues 12, $12^a$, 13, and $13^a$, which communicate with the regenerator-chambers 3, $3^a$, 5, and $5^a$, which are filled with checker-work. (Not shown in the drawings.) The openings through which air is admitted into the passages 12, $12^a$, 13, and $13^a$ are made directly into said passages through the floor above, so that the air does not have to be drawn down through a closed passage, as is usual in other constructions. The admission of air through the openings is regulated by means of lids or covers 14, $14^a$, 15, and $15^a$, which may be raised or lowered to open or close said openings.

A short distance below the openings 10, $10^a$, 11, and $11^a$ and between the air-flues 12, $12^a$, 13, and $13^a$ are located valves 16, $16^a$, 17, and $17^a$, which serve to control the openings 18, $18^a$, 19, and $19^a$ between the air-flues and the stack-flue. These valves are so arranged that when they are in position to fully open communication between the air-flues and the stack-flue they close the openings through which air is admitted to the air-flues, so that at the time either of the valves closes communication between an air-flue and the atmosphere it is immaterial whether the adjacent lid or cover is raised or lowered, and when the valves 16 $16^a$ 17 $17^a$ are in position to close the communications between the air-flues and the stack-flue they are moved away from the openings through which air is admitted to the air-flues, and the quantity of air admitted is then regulated by the lids or covers 14 $14^a$ 15 $15^a$.

As shown in the drawings, the air and gas valves are in position to admit air and gas to the chambers $3^a$, $5^a$, and $4^a$ on the left of Figs. 1 and 2 and to permit the waste gases to pass from the furnace through the chambers 3, 4, and 5 through the flues 13, 8, and 12 into the stack-flue 7. With the gas-valve 9 in the position shown in Fig. 8, the gas passes down from the pipe 6 into the gas-flue $8^a$, through the flue $8^a$ into the gas-chamber $4^a$ and up through the gas-flue $20^a$ into the furnace 1. At the same time the valves $16^a$ and $17^a$ close communication between the air-flues $12^a$ and $13^a$ and the stack-flue 7 and permit a free passage of air through the openings $10^a$ and $11^a$ into the passages $12^a$ and $13^a$ and through the chambers $3^a$ and $5^a$, from which, after being heated, it passes through the air-flues 21$^a$ and 22$^a$ into the furnace 1, where the hot air and gas are mingled and combustion takes place. The products of combustion then pass out at the other end of the furnace through the flues 20, 21, and 22 into the chambers 3, 4, and 5, where they heat the checker-work and pass through the passages 13, 8, and 12 into the stack-flue 7.

The arrangement of the air ports or flues 21 22 21$^a$ 22$^a$ with relation to the gas ports or flues 20 and 20$^a$ is such that when the air-admission ports 10 11 or 10$^a$ 11$^a$ are opened, so as to admit equal quantities of air, the air issues with equal force and in equal quantities from the air-flues, and the combined air and gas in a state of combustion is equally distributed to all parts of the furnace; but if for any reason it is required to throw the flame and hot gases to one side or the other the cover or valve which regulates the admission of air to the air-flue on that side is partially or wholly closed, and the air which enters through the flue on the other side deflects the flame toward the side to be heated. For example, if the gas is entering the furnace through the port or flue 20$^a$ (see Fig. 6) and it is desired to give more heat to the side A than to the side B, it may be done by giving a freer admission of air through the opening or port 10$^a$ or by contracting the opening 11$^a$, or by a proper regulation of both of these openings in such a manner that the air enters through the port or flue 21$^a$ with greater force and in greater quantity than through the port 22$^a$. The consequence is that the mingled air and gas in a state of combustion are deflected to the side A of the furnace, and that side will receive more heat than the other, and the quantity of heat and the extent of the deflection of the gases will depend on the quantity of air admitted and the difference in the quantity admitted through the two flues 21$^a$ and 22$^a$. In a corresponding manner more heat may be given to the side B than to the side A, and the heat on either side may be diminished by diminishing the supply of air admitted through the air-flue on the opposite side. In this manner I am enabled to increase or decrease the heat in any part of the furnace at will and to regulate such increase or decrease to any degree desired.

While my invention is specially adapted for use with producer gas, it is equally applicable to use with natural gas, the action of the air from the flues 21 22 or 21$^a$ 22$^a$ being the same on the jet of natural gas if it is placed in the same relative position as the flue 20 or 20$^a$. Further, my invention is not limited to a construction in which a single gas-flue is employed at each end of the furnace, but is equally applicable to furnaces employing more than one set of gas-flues and air-flues at each end.

Figure 9:
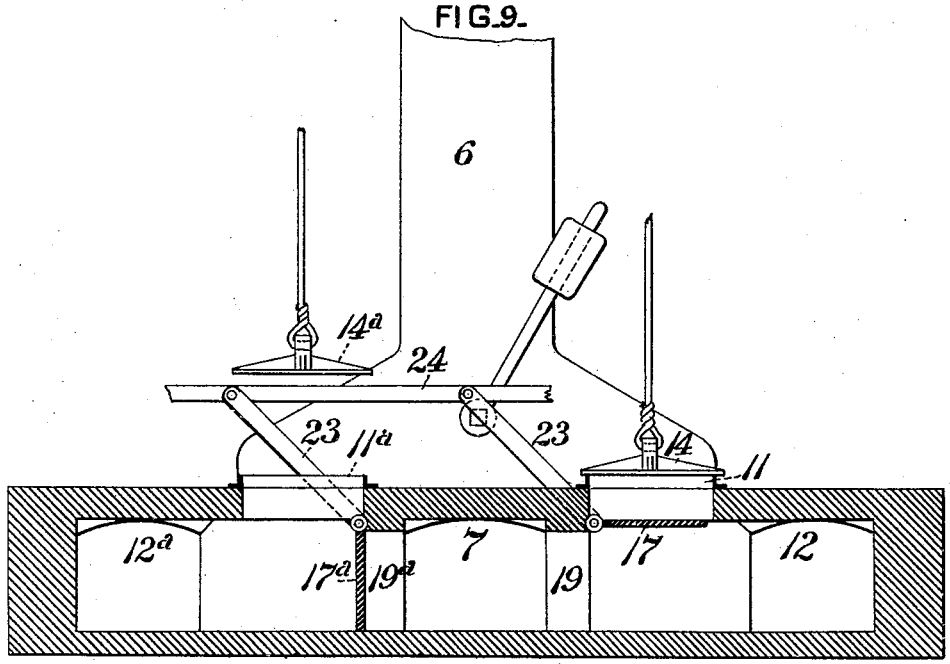

The valves 16, 16$^a$, 17, and 17$^a$, which control the openings from the air-flues 12, 12$^a$, 13, and 13$^a$ to the stack-flue and to the atmosphere, are arranged in pairs on opposite sides of the furnace and are operated by means of the levers 23, each pair of levers being connected to a rod 24, as shown in Figs. 7 and 9, so that longitudinal movement of the rod operates both valves simultaneously, and when one valve of a pair closes the communication between its air-flue and the stack-flue the other valve of the same pair opens communication between its air-flue and the stack-flue and closes communication between the air-flue and the atmosphere. The valves, levers, and connecting-rod 24 are so connected together that the valves are counterbalanced, and the lifting of one valve is assisted by the lowering of the other, so that it requires much less force to move them than would be required if the valves were not connected in any way.

I claim as my invention and desire to secure by Letters Patent—

1. The improvement in the method of controlling the distribution of heat to a furnace, which consists in varying the supply of air to opposite sides of a jet of gas, and thereby causing the greater supply of air to deflect the flame toward the opposite side of the furnace, substantially as set forth.

2. The combination, in a gas-furnace, of a gas-port opening therein, air-ports opening in rear of and at opposite sides of the gas-port, and valve mechanism for controlling the supply of air to each air-port, so as to cause the deflection of the hot gases toward either side of the furnace, substantially as set forth.

3. The combination, in a gas-furnace, of a gas-port opening therein, two air-ports in rear of the opposite sides of the gas-port, and valve mechanism for increasing or decreasing the supply of air to either or both air-ports, whereby the hot gases may be deflected toward the side of the furnace away from the port through which the greater supply of air enters, substantially as set forth.

4. The combination, in a regenerative gas-furnace, of a central regenerative gas-chamber, a flue leading therefrom to the furnace, two regenerative air-chambers, one located on each side of the regenerative gas-chamber, and a flue from each of said air-chambers, leading to a port-opening in rear of each side of the gas-flue, substantially as set forth.

5. A regenerative gas-furnace having two sets of regenerative chambers, one set at each end, consisting of a central gas-chamber and two air-chambers, one on each side of the gas-chamber, with flues opening into opposite ends of the furnace, substantially as set forth.

In testimony whereof I have hereunto set my hand.

FRIEDRICH DANNER.

Witnesses:
J. SNOWDEN BELL,
F. E. GAITHER.